(12) United States Patent
Jayaraman et al.

(10) Patent No.: US 12,283,910 B2
(45) Date of Patent: Apr. 22, 2025

(54) MODEL-BASED HEALTH MONITORING OF ELECTRIC MOTORS

(71) Applicant: Woodward, Inc., Fort Collins, CO (US)

(72) Inventors: Ganga P. Jayaraman, Buffalo Grove, IL (US); Steven Adams, Park Ridge, IL (US)

(73) Assignee: Woodward, Inc., Fort Collins, CO (US)

( * ) Notice: Subject to any disclaimer, the term of this patent is extended or adjusted under 35 U.S.C. 154(b) by 196 days.

(21) Appl. No.: 18/075,165

(22) Filed: Dec. 5, 2022

(65) Prior Publication Data

US 2024/0186922 A1 Jun. 6, 2024

(51) Int. Cl.
*F04B 49/06* (2006.01)
*H02P 7/22* (2006.01)
*H02P 7/32* (2006.01)

(52) U.S. Cl.
CPC ............. *H02P 7/22* (2013.01); *H02P 7/325* (2013.01)

(58) Field of Classification Search
CPC ........ F04B 49/065; H02P 27/047; H02P 7/22; H02P 7/325; G01R 31/3277
See application file for complete search history.

(56) References Cited

U.S. PATENT DOCUMENTS

| | | | |
|---|---|---|---|
| 6,014,598 A | 1/2000 | Duyar et al. | |
| 6,393,373 B1 | 5/2002 | Duyar et al. | |
| 6,885,922 B2 | 4/2005 | Yao et al. | |
| 7,260,501 B2 | 8/2007 | Pattipatti et al. | |
| 7,451,021 B2 | 11/2008 | Wilson | |
| 7,536,277 B2 | 5/2009 | Pattipatti et al. | |
| 7,567,862 B2 | 7/2009 | Pelton et al. | |
| 7,777,516 B2 | 8/2010 | Zhou et al. | |
| 7,847,580 B2 | 12/2010 | Zhou et al. | |
| 7,970,583 B2 | 6/2011 | Novis et al. | |
| 8,060,340 B2 | 11/2011 | Gao et al. | |
| 8,195,311 B2 | 6/2012 | Karpman et al. | |
| 8,775,124 B2 | 7/2014 | Fijany et al. | |

(Continued)

FOREIGN PATENT DOCUMENTS

| | | |
|---|---|---|
| EP | 1061269 | 12/2000 |
| EP | 2933647 | 10/2015 |

OTHER PUBLICATIONS

International Search Report and Written Opinion in International Application No. PCT/US2023/082296, mailed on Apr. 3, 2024, 17 pages.

(Continued)

*Primary Examiner* — Cortez M Cook
(74) *Attorney, Agent, or Firm* — Fish & Richardson P.C.

(57) ABSTRACT

The subject matter of this specification can be embodied in, among other things, an electric motor health monitoring system that includes an estimator module configured to model one or more estimated motor values of an electric motor based on one or more motor control parameters and one or more motor control states, a non-transitory computer readable medium, and a fault detector module configured to (1) provide a fault signal based on the modeled one or more estimated motor values of the motor and a predetermined parameter threshold value, and (2) modify the non-transitory computer readable medium based on the fault signal.

30 Claims, 9 Drawing Sheets

(56) References Cited

U.S. PATENT DOCUMENTS

| | | |
|---|---|---|
| 9,273,613 B2 | 3/2016 | Aurousseau et al. |
| 9,366,451 B2 | 6/2016 | Guo et al. |
| 9,709,979 B2 | 7/2017 | Guillory et al. |
| 9,845,012 B2 | 12/2017 | Lu et al. |
| 9,944,267 B2 | 4/2018 | Huang et al. |
| 10,374,532 B2 | 8/2019 | Park et al. |
| 10,571,522 B2 | 2/2020 | Kuruppu |
| 10,591,548 B2 | 3/2020 | Narasimha et al. |
| 10,598,732 B2 | 3/2020 | Sarwar et al. |
| 10,663,519 B2 | 5/2020 | Fedigan |
| 10,730,186 B2 | 8/2020 | Haddadin |
| 2003/0090228 A1 | 5/2003 | Wilkens |
| 2008/0251071 A1 | 10/2008 | Armitstead et al. |
| 2013/0342142 A1 | 12/2013 | Marcinkiewicz et al. |
| 2015/0188471 A1* | 7/2015 | Kim .................. H02P 27/047 |
| | | 318/400.09 |
| 2019/0136854 A1* | 5/2019 | Watanabe ............ F04B 49/065 |
| 2019/0393818 A1 | 12/2019 | Gizinski et al. |
| 2021/0159842 A1* | 5/2021 | Nakamura ......... G01R 31/3277 |
| 2021/0173390 A1 | 6/2021 | Hosek et al. |
| 2021/0341901 A1 | 11/2021 | Miklosovic et al. |

OTHER PUBLICATIONS

Mwasilu et al., "Enhanced Fault-Tolerant Control of Interior PMSMs Based on an Adaptive EKF for EV Traction Applications," IEEE Transactions on Power Electronics, Aug. 2016, 31(8):5746-5758.

* cited by examiner

MODEL-BASED HEALTH MONITORING OF ELECTRIC MOTORS

TECHNICAL FIELD

This instant specification relates to systems and techniques for monitoring the operational health of electric motors.

BACKGROUND

Electromechanical actuators use permanent magnet synchronous motors, also known as brushless direct current (DC) motors, or alternating current (AC) induction motors or brushed DC motors as prime movers. These motors typically carry windings of two or more phases to generate a rotating magnetic field through mechanical or electronic commutation. An excitation field is sometimes generated using permanent magnets embedded in the rotor or the stator. The interaction between the excitation field and the armature field produces torque and speed. This torque is transferred to the actuator through a motor shaft that is supported by bearings.

A failure in the winding, magnets or the shaft bearing of the motor can cause a performance reduction in the form of lower torque and speed or a complete failure to move. This can be disastrous for safety critical applications such as flight control, or inconvenient and costly, at the very least, in other applications.

Motor winding impedance can change due to winding insulation failures due to high operating temperatures. This can cause winding turn-to-turn shorts, or shorts between a few turns of the winding to the motor housing. A short between phases at the terminals, or phase to ground at the terminals would cause the motor not only to fail to function as a motor, but to actively resist motion by presenting a damping torque. In an actuator that uses a single motor as a prime mover, this can lead to a complete failure.

For at least these reasons, actuators for safety critical applications (such as those used for controlling flight control surfaces) typically use redundant motors in a torque-summed configuration using mechanical gearing so that they share the total load on the actuator to meet the operating load and speed requirements. However, when one motor fails due to a short in its winding, the drive circuit fails due to the imbalance in the motor phases. The failed motor can act as a generator, and the currents in the shorted windings can generate a resistive torque. This increases the load on the functioning motor in the dual-motor setup, and if the motor is not sized for this extra load then the functioning motor may fail to provide the necessary torque.

Other failures in a motor in a dual-redundant architecture can also cause the healthy motor to malfunction. A failure in the motor bearing can cause the motor shaft to seize or present excessive damping. Some failures do not affect the healthy motor, such as a reduction in the excitation magnetic field due to the loss of a piece of magnet from the rotor, or due to demagnetization at high temperatures. However, in actuators that use a single motor as a prime mover, such failure can cause the actuator to stop functioning due to loss of speed and torque.

SUMMARY

In general, this document describes systems and techniques for monitoring the operational health of electric motors. In general, a health monitoring system is run as a motor is controlled. The health monitoring system generally includes two main parts: 1) a state estimator and 2) a fault detector.

In an example embodiment, an electric motor health monitoring system includes an estimator module configured to model one or more estimated motor values of an electric motor based on one or more motor control parameters and one or more motor control states, a non-transitory computer readable medium, and a fault detector module configured to (1) provide a fault signal based on the modeled one or more estimated motor values of the motor and a predetermined parameter threshold value, and (2) modify the non-transitory computer readable medium based on the fault signal.

Various embodiments can include some, all, or none of the following features. The electric motor can be one of a brushless direct-current (DC) motor or a permanent magnet synchronous motor (PMSM). The one or more motor control parameters and the one or more motor control states can be received from an electric motor controller configured to determine the one or more motor control parameters and the one or more motor control states and provide one or more motor control outputs to the electric motor based on the one or more determined motor control parameters and the one or more determined motor control states. The estimator module can be configured to receive one or more feedback signals based on one or more measured motor states, determine a state value representative of a state of the motor based on the received one or more feedback signals, the motor control parameters, and the one or more motor control states, determine one or more of the estimated motor values of the motor based on the received one or more feedback signals, determine an error value based on the received one or more feedback signals and on one or more of the determined one or more estimated motor values, determine a gain value based on a covariance of the one or more estimated motor values and a predetermined covariance of model uncertainties and a predetermined covariance of measurement noise, and reduce the error value based on a control loop based on the determined gain value. The estimator module can be configured to perform a first collection of update operations at a first frequency, the first collection of update operations including determining an error covariance value based on the one or more motor control parameters, determining an estimator gain matrix based on the determined error covariance, extrapolating a state value based on the estimated gain matrix and the one or more motor control parameters, and providing at least one of the extrapolated state value and the determined error covariance value as the one or more estimated motor values. The extrapolated state value is based on an equation: $x\_k(+)=x\_k(-)+K\_k(y\_k-Hx\_k(-))$. The estimator module can be further configured to perform a second collection of update operations at a second frequency, the second collection of update operations including determining an updated state value based on the extrapolated state value and a time value based on the second frequency, and determining an updated error covariance value based on the determined error covariance value and a time value based on the second frequency, and providing at least one of the updated state value and the updated error covariance value as the one or more estimated motor values. The updated state value can be based on the equation: $x_{k+1}=x_k(+)+\int_{kT}^{(k+1)T}[f(x(t))+g(x(t)u(t)]dt$. The second frequency can be more frequent than the first frequency. The fault detector module can be configured to perform one or more of (1) providing the fault signal as an indicator representative of a presence of a fault of the electric motor, and (2) switching control of an actuatable mechanical load from the electric motor to a redundant electric motor based on the provided fault signal. The fault detector module can be configured to compare one or more of the estimated motor values to a predetermined motor value threshold value, and provide a motor fault signal based on the comparing.

In an example implementation, a method of monitoring electric motor health includes receiving one or more motor control states of an electric motor, estimating one or more estimated motor values of the electric motor based on one or more of the received motor control states and one or more motor control parameters, comparing one or more of the estimated motor values to a predetermined parameter threshold value, providing a motor fault signal based on the comparing, and modifying a non-transitory computer readable medium based on the provided motor fault signal.

Various implementations can include some, all, or none of the following features. The electric motor can be one of a brushless direct-current (DC) motor or a permanent magnet synchronous motor (PMSM). The method can include determining the one or more motor control states of the electric motor. The method can include providing, to the electric motor, one or more motor control signals based on the determined one or more motor control states. Estimating one or more estimated motor values of the electric motor based on one or more of the received motor control states can include receiving one or more feedback signals based on one or more measured states of the electric motor, determining a state value representative of a state of the electric motor based on the received one or more feedback signals, determining one or more parameter values of the electric motor based on the received one or more feedback signals, determining an error value based on the received one or more feedback signals and on one or more of the determined state values and the determined one or more parameter values, determining a gain value based on a covariance of the determined state value and a predetermined covariance of model uncertainties and a predetermined covariance of measurement noise, and reducing the error value based on a control loop based on the determined gain value. Estimating one or more estimated motor values of the electric motor based on one or more of the received motor control states can include performing a first collection of update operations at a first frequency, the first collection of update operations including determining an error covariance value based on one or more of the received motor control states, determining an estimator gain matrix based on the determined error covariance, extrapolating a state value based on the estimated gain matrix and one or more of the received motor control states, and providing at least one of the extrapolated state value and the determined error covariance value as the one or more estimated motor values. The method claim 17, wherein the extrapolated state value is based on the equation: $x_k(+)=x_k(-)+K_k(y_k-Hx_k(-))$. Estimating one or more estimated motor values of the electric motor based on one or more of the received motor control states can include performing a second collection of update operations at a second frequency, the second collection of update operations including determining an updated state value based on the extrapolated state value and a time value based on the second frequency, and determining an updated error covariance value based on the determined error covariance value and a time value based on the second frequency, and providing at least one of the updated state value and the updated error covariance value as the one or more estimated motor values. The updated state value can be based on the equation: $x_{k+1}=x_k(+)+\int_{kT}^{(k+1)T}[f(x(t))+g(x(t)u(t)]dt$. The second frequency can be more frequent than the first frequency.

The method can include one or more of: (1) providing the fault signal as an indicator representative of a presence of a fault of the electric motor, and (2) switching control of an actuatable mechanical load from the electric motor to a redundant electric motor based on the provided fault signal.

In another example embodiment, an electric motor control system includes a motor controller configured to determine one or more motor control states and provide the one or more determined motor control states to an electric motor, and a motor health monitor having an estimator module configured to model one or more estimated motor values of the electric motor based on one or more motor control parameters and the one or more motor control states, and a fault detector module configured to provide a fault signal based on the modeled one or more estimated motor values of the electric motor and a predetermined motor value threshold value.

Various embodiments can include some, all, or none of the following features. The electric motor can be one of a brushless direct-current (DC) motor or a permanent magnet synchronous motor (PMSM). The estimator module can be configured to receive one or more feedback signals based on one or more measured states of the motor, determine an estimated state value representative of a state of the motor based on the received one or more feedback signals, determine one or more estimated parameter values of the motor based on the received one or more feedback signals, determine an error value based on the receiving one or more feedback signals and on one or more of the determined state value and the determined one or more parameter values, determine a gain value based on a covariance of the determined state value and a predetermined covariance of model uncertainties and a predetermined covariance of measurement noise, and reduce the error value based on a control loop based on the determined gain value. The estimator module can be configured to perform a first collection of update operations at a first frequency, the first collection of update operations including determining an error covariance value based on the one or more motor control parameters, determining an estimator gain matrix based on the determined error covariance, extrapolating a state value based on the estimated gain matrix and the one or more motor control parameters, and providing at least one of the extrapolated state value and the determined error covariance value as the one or more estimated motor values. The extrapolated state value can be based on the equation: $x_k(+)=x_k(-)+K_k(y_k-Hx_k(-))$. The estimator module can be further configured to perform a second collection of update operations at a second frequency, the second collection of update operations including determining an updated state value based on the extrapolated state value and a time value based on the second frequency, determining an updated error covariance value based on the determined error covariance value and a time value based on the second frequency, and providing at least one of the updated state value and the updated error. The fault detector module can be configured to perform one or more of (1) provide the fault signal as an indicator representative of a presence of a fault of the electric motor, (2) switch control of an actuatable mechanical load from the electric motor to a redundant electric motor based on the provided fault signal, and (3) modify contents of a non-transitory computer-readable medium based on the provided fault signal. The fault detector module can be configured to compare one or more of the one or more estimated motor values to a predetermined motor value threshold value, and provide a motor fault signal based on the comparing.

The systems and techniques described here may provide one or more of the following advantages. First, a system can provide monitoring of sudden or gradual faults in electric actuators and/or connected loads. Second, the system can predict impending failures. Third, the system can provide "virtual sensor" functions, in which properties of a physical actuator or load can be estimated by modelling the properties. Fourth, the system can monitor estimated properties of a physical actuator or load without the use of physical sensors.

The details of one or more implementations are set forth in the accompanying drawings and the description below. Other features and advantages will be apparent from the description and drawings, and from the claims.

DETAILED DESCRIPTION

Figure 1:
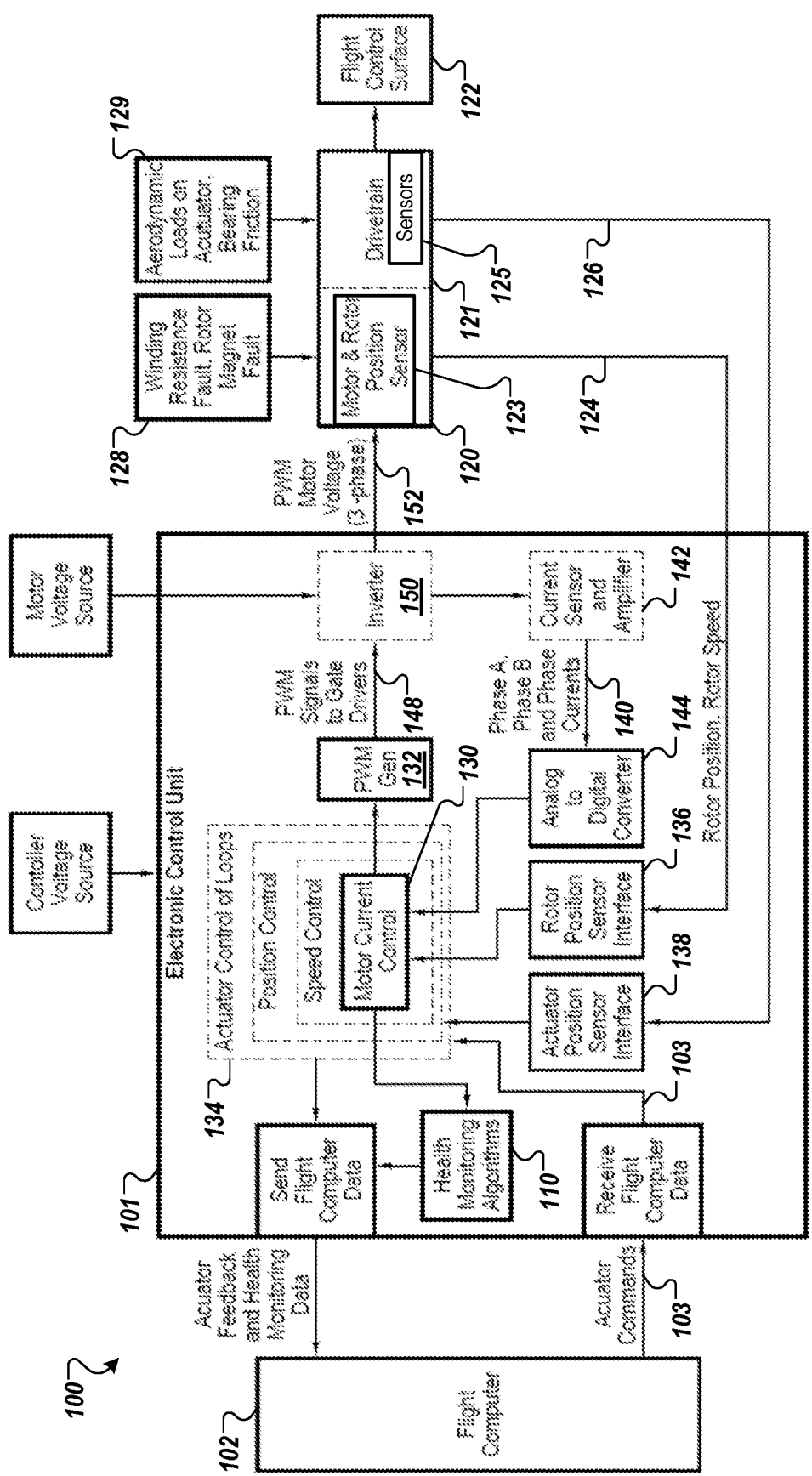
FIG. 1 is a block diagram that shows an example of a motor actuator system that includes a motor actuator monitoring system for monitoring the health of a motor actuator.

This document describes systems and techniques for monitoring the operational health of electric motors. In general, a motor controller performs closed-loop control of a motor or motor actuator. An estimator system simulates or emulates the operation of the motor based on the control outputs determined by the motor controller and provides simulated feedback. A fault detection system compares measured and simulated feedback in order to determine if a discrepancy exists, and identifies the discrepancy as a motor fault. The estimator system can also provide estimated feedback that describes dynamic internal states of the simulated motor that might be difficult, costly, or impractical to sense and/or monitor in the real motor. As such, the estimator system can provide one or more virtual sensors that provide dynamically estimated measurements of internal functions of the physical motor, and these virtual measurements can be used by the motor controller (e.g., as part of its closed-loop control function) and/or the fault detection system (e.g., to detect motor faults).

Some previous methods to detect changes in motor operating conditions monitor motor variables, such as phase currents or motor speed, and check whether they go out of the bounds of safe operation. This can be useful when an operator wants to know that a serious failure has occurred, and wants to take some action to continue operation of the motor in a fail-safe mode. However, in order to increase operational availability and possibly use less actuator and sensor redundancy, the systems and techniques described below can provide predictions of failures such as those described above before they can cause damage to the motor or actuator. Some existing methods require measurements of motor operating variables to gather information that can reveal the presence of a fault. For detecting motor winding impedance, motor phase currents and phase voltages can be measured. For detecting bearing failures, accelerometers, vibration sensors, motor current sensors, and/or torque sensors can be used. Loss of motor magnet strength can be detected by measuring motor back-EMF and motor speed (e.g., if the motor back-EMF can be measured).

The calculation of the required parameter using these methods can get complicated due the interaction of different motor variables. In order to calculate the motor winding resistance correctly, the voltage drop across the winding can be calculated as the difference between the applied voltage and the back EMF voltage, and this difference can divided by the phase current. However, the back-EMF voltage is measurable only if one of the phases is not excited during the measurement. This is not true for motor drive methods that excite all three phases all the time. In such cases, back-EMF is estimated based on the rotor speed and the nominal back-EMF constant of the motor. Likewise, detecting bearing failure using accelerometers or vibration sensors can add the cost of these sensors, which typically do not serve any direct purpose for driving the motor. Bearing failure can also be detected by processing the motor current signals for failure signatures, but again, this is a data-based method that is applicable only to this failure.

It is therefore advantageous to detect these failures without using any additional sensors other than the ones used to implement the motor drive. Such sensors can include motor phase current sensors, rotor speed sensors, rotor position sensors, and motor applied voltage sensors. It is also advantageous to calculate some or all of the motor parameters of interest as the output of a single algorithm that can account for some or all of the inter-relationships of the motor variables (e.g., to keep the algorithm compact and consistent). An added advantage is that with certain model-based techniques, an estimate of the motor states, substantially free from noise and drift from the corresponding sensor measurements, can be determined from the simulation instead of the physical motor.

FIG. 1 is a block diagram that shows an example of an electric motor control system 100 that includes an estimator module 110 for monitoring the health of a motor actuator 120. In some implementations, the motor actuator can be an electric motor. For example, the motor actuator 120 can be a brushless direct-current (DC) motor or a permanent magnet synchronous motor (PMSM).

The motor actuator 120 is configured to drive a drivetrain 121 that is, in the illustrated example, configured to urge movement of a flight control surface 122. The motor actuator 120 includes a collection of sensors 123 configured to provide a collection of position and speed feedback signals 124. The drivetrain 121 includes a sensor 125 configured to provide a position feedback signal 126. The motor actuator 120 is subject to a collection of inputs 128 that can affect the performance of the motor actuator 120, such as winding resistance faults and rotor magnet faults. The drivetrain 121 is subject to a collection of inputs 129 that can affect the performance of the drivetrain 121 and/or the motor actuator 120, such as aerodynamic loads and bearing friction.

The example system 100 includes an electronic control unit 101 that is configured to receive actuator commands from a flight computer 102 or any other appropriate type of controller, and control the motor actuator 120. The electronic control unit 101 includes the estimator module 110 (e.g., a fault detector module) that performs health monitoring algorithms and will be discussed in more detail in the descriptions of FIGS. 3-11. In the illustrated example, the estimator module 110 is part of the electronic control unit (e.g., an internal software or hardware module). In some embodiments, the estimator module 110 can be implemented as a circuit that is external to the electronic control unit 101 (e.g., a retrofit module).

The electronic control unit 101 is configured to receive one or more actuator commands 103 from the flight computer 102. A motor current control module 130 (e.g., an electric motor controller) controls a pulse width modulated (PWM) signal generator 132 based on one or more actuator control loops 134 (e.g., speed control loop, position control loop). The motor current control module 130 performs the actuator control loops 134 based on one or more of the actuator commands 103, the collection of position and speed feedback signals 124 (received at a rotor position sensor interface 136), the position feedback signal 126 (received at an actuator position sensor interface 138), and a collection of motor phase current signals 140 (sensed by a current sensor 142 and received at an analog-to-digital converter 144).

The motor current control module 130 controls the PWM signal generator 132 to provide PWM signals 148 to gate drivers of an inverter module 150. The inverter module 150 is configured to provide a 3-phase motor signal 152 to control the speed and direction of the motor actuator 120 based on the PWM signals 148. The current sensor 142 is configured to sense the 3-phase motor signal 152 and provide the collection of motor phase current signals 140.

As the motor current control module 130 of the electronic control unit 101 controls the motor actuator 120 to control movement of the flight control surface 122, the estimator module 110 receives motor control information from the motor current control module 130 and models (e.g., performs a simulation) of the motor actuator 120. As will be described in more detail below, the motor current control module 130 can estimate the expected behavior of the motor actuator 120 and compare that estimated behavior to sensed behavior of the motor actuator 120 and determine if a fault has occurred. The estimator module 110 provides health and/or fault signals that can be received by the flight computer 102 (e.g., to trigger an alarm or notification, or trigger or request a remedial action).

Figure 2:
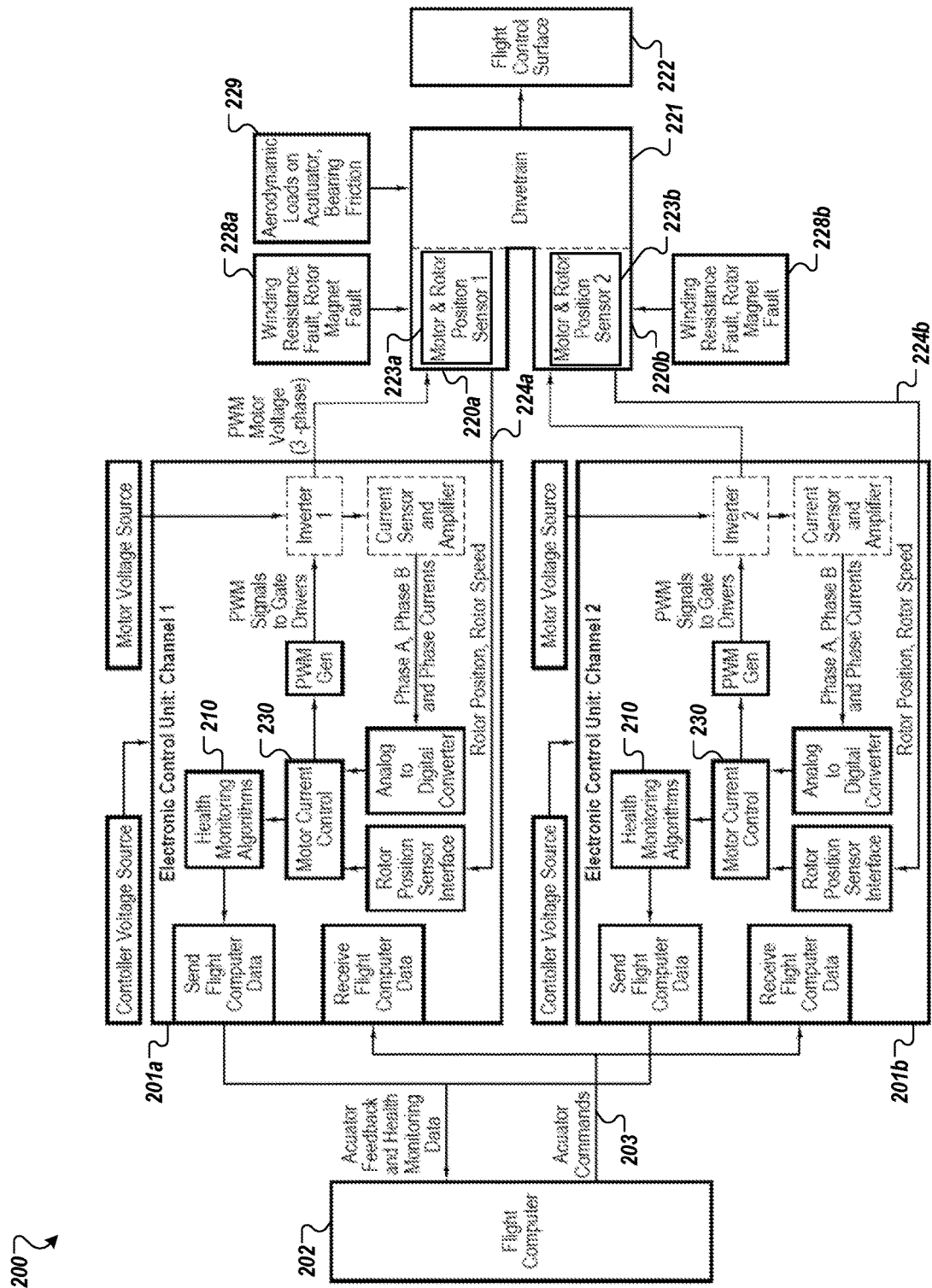
FIG. 2 is a block diagram that shows another example of a motor actuator system that includes a motor actuator monitoring system for monitoring the health of multiple motor actuators.

FIG. 2 is a block diagram that shows another example of a motor control system 200 that includes a motor actuator monitoring system for monitoring the health of multiple motor actuators.

In the illustrated example, an electronic control unit 201a and an electronic control unit 201b are configured to control a drivetrain 221 that is configured to move a flight control surface 222. The drivetrain 221 is driven by a motor actuator 220a and a motor actuator 220b (e.g., in a redundant configuration). The drivetrain 221 is subject to a collection of inputs 229 that can affect the performance of the drivetrain 221, such as aerodynamic loads and bearing friction.

The motor actuators 220a and 220b each include a respective collection of sensors 223a and 223b configured to provide a collection of position and speed feedback signals 224a and 224b. The motor actuators 220a and 220b are subject to collections of inputs 228a and 228b that can affect the performance of the motor actuators 220a and 220b, such as winding resistance faults and rotor magnet faults.

Functionally, each of the electronic control units 201a and 201b are substantially similar to the example electronic control unit 101 of FIG. 1. Both of the electronic control units 201a and 201b are configured to receive actuator commands 203 from a flight computer 202. The electronic control units 201a and 201b are configured to operate redundantly and/or cooperatively in order to control the motor actuators 220a and 220b. Each of the electronic control units 201a and 201b includes a motor current control module 230 (e.g., an electric motor controller) to control its respective motor actuator 220a or 220b, and each of the electronic control units 201a and 201b also includes an estimator module 210 configured as a health monitoring module to estimate the expected behavior of its respective motor actuator 220a or 220b and compare that estimated behavior to sensed behavior of the respective motor actuator 220a or 220b and determine if a fault has occurred. The estimator modules 210 provide health and/or fault signals that can be received by the flight computer 202 (e.g., to trigger an alarm or notification, or trigger or request a remedial action). In some implementations, the estimator modules 210 can be configured to perform one or more of providing the fault signal as an indicator representative of a presence of a fault of the motor actuators 220a, 220b, and/or switch control of an actuatable mechanical load (e.g., the drivetrain 221, the flight control surface 222) from a faulted one of the motor actuators (e.g., 220a) to a redundant one of the motor actuators (e.g., 220b) based on the provided fault signal.

Figure 3:
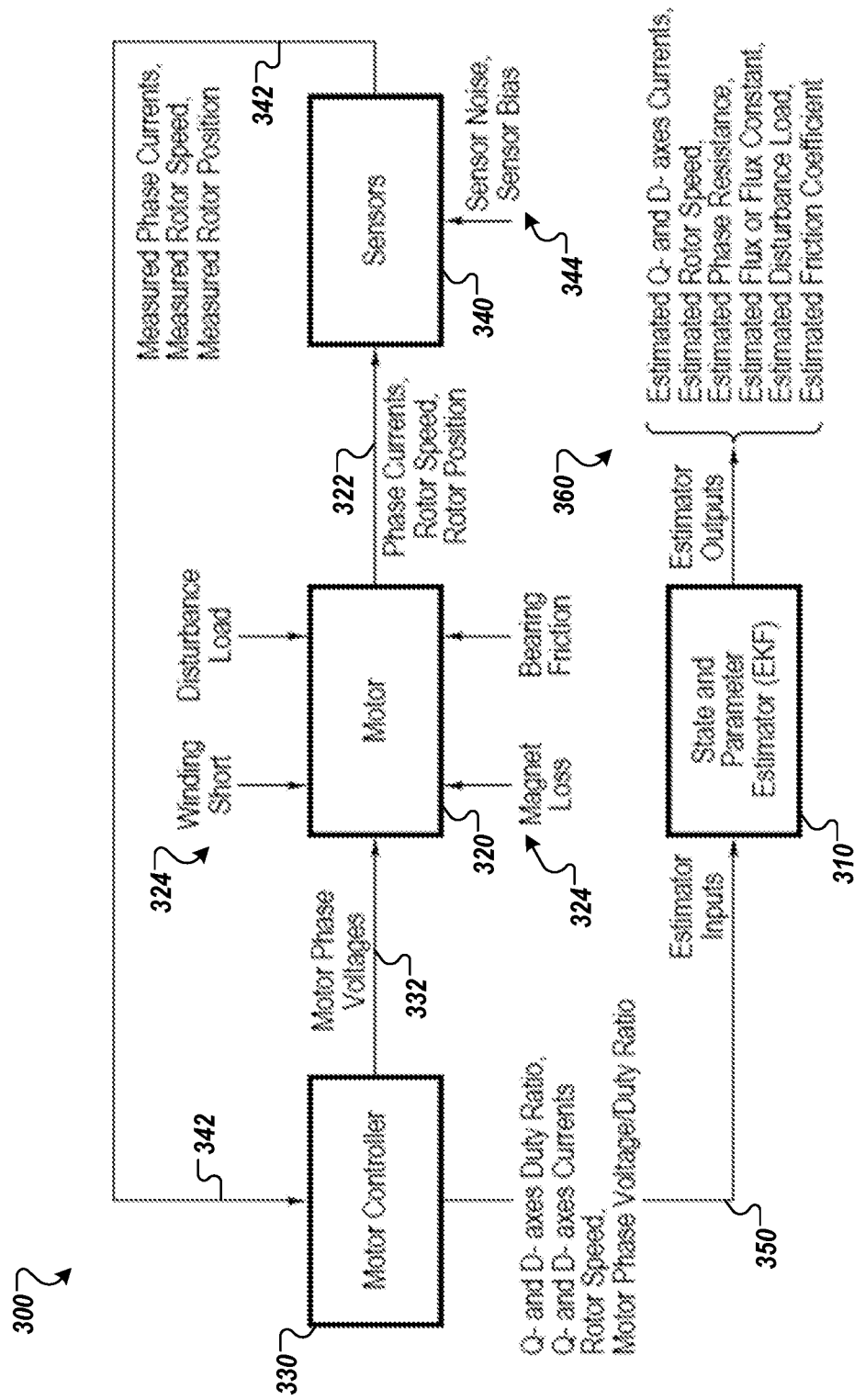
FIG. 3 is a block diagram that shows an example of a closed loop state and parameter estimator for a motor actuator.

FIG. 3 is a block diagram that shows an example of a closed loop state and parameter estimator 300 for a motor actuator. In some examples, the estimator 300 can be part of the example system 100 or 200 of FIGS. 1 and 2.

FIG. 3 shows an example context of a state estimator 310 in relation to a motor current control loop. In the illustrated example, the data used by the state estimator 310 and the faults that could occur to a motor actuator 320 are shown. An electric motor controller 330 determines and provides a collection of motor phase voltages 332 to the motor actuator 320. Since the motor actuator 320 is a physical device configured to actuate a physical load, the motor actuator 320 may be subject to a collection of real-world disturbances and faults 324, such as winding shorts, disturbance loads, magnet losses, and bearing friction.

A collection 322 of phase currents, rotor speeds, and rotor positions are sensed by a collection of sensors 340. The sensors 340 measure, amplify, and filter the collection 322 before they are provided as a collection of feedback signals 342 to the motor controller (e.g., in the form of analog input signals). In some embodiments, one or more current sensors can be used to measure the phase currents. In some embodiments, the rotor position and/or speed can be sensed by a resolver or any other appropriate type of incremental encoder, and can use dedicated hardware interfaces for processing the signals. In some embodiments, the rotor position and speed feedback signals can be provided to the motor controller in either digital or analog form (e.g., depending on the signal conditioning circuits). The sensors 340 are physical devices, and as such can be subject to a collection of disturbances 344 that can partly interfere with the accuracy of the feedback signals 342. For example, sensor noise and/or sensor bias can cause a reduction in the fidelity of the feedback signals 342.

The motor controller 330 receives the feedback signals 342 and a command signal (e.g., a current command from an outer control loop such as a motor speed loop or an actuator position loop), and determines a collection of motor control parameters 350 from which the collection of motor phase voltages 332 are determined. In some implementations, the collection of motor control parameters 350 can include one or more parameters that are descriptive of Q axis duty ratio(s), D axis duty ratio(s), Q axis motor current(s), D axis motor current(s), rotor speed(s), motor phase voltage(s), and motor phase duty ratio(s), motor commutation output(s). The motor controller 330 calculates a PWM duty ratio based on a motor current closed loop control algorithm. This duty ratio is converted to a PWM waveform that is applied to the gate drive circuits of an inverter, and the output of the inverter is a high power PWM voltage that drives the winding phases of the motor actuator 320.

The motor controller 330 also provides the collection of motor control parameters 350 to the state estimator 310 (e.g., as estimator inputs). For example, the duty ratio corresponding to one or more of the motor phases or one or more voltages proportional to the duty ratio(s) can be input to the state estimator 310. The state estimator 310 models the behavior of the motor actuator 320 based on the motor control parameters 350 and provides a collection of estimated outputs 360. For example, the collection of estimated outputs 360 can include information that is descriptive of one or more of estimated Q axis current(s), estimated D axis current(s), estimated rotor speed(s), estimated phase resistance(s), estimated flux(es), estimated flux constant(s), estimated disturbance load(s), and estimated friction coefficient(s).

In use, one or more elements of the collection 342 can be compared to one or more elements of the estimated outputs 360 to determine a health status of the motor actuator 320. For example, differences between measured values of the collection 342 and the idealized values of the estimated outputs 360 may be attributable to the collection of disturbances and faults 324 and/or 344, and may be used to analyze such disturbances. In another example, the state estimator 310 may be configured with a collection of estimated disturbances, such as an expected friction coefficient of a load or an estimated motor winding resistance, such that differences between the measured and estimated values may be used to detect when real-world friction and/or resistance drifts away from the expected values, and may be indicative of a fault or an impending fault in the motor actuator 320 or its load.

In some implementations, the estimator 300 can be configured for detecting additional faults. In other (e.g., more complex) actuator level health monitoring applications in which other parameters could be monitored, other actuator level signals such as actuator position and actuator speed could be sensed. In another example, for a motor driven hydraulic pump the state and parameter estimator could be configured to read the pressure at the pump input and output, motor speed and currents, and/or pump flow output.

Figure 4:
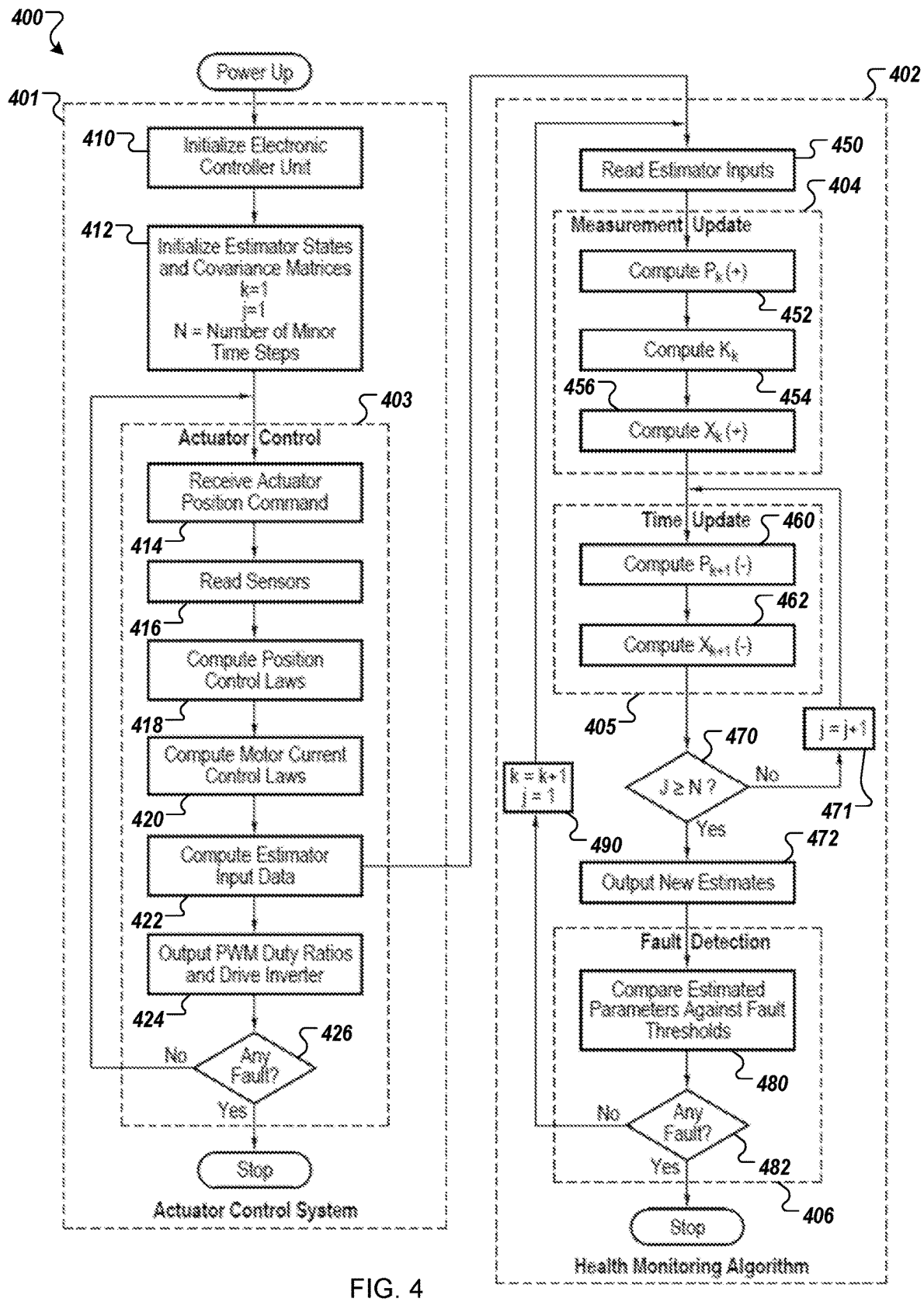
FIG. 4 is a flow chart that shows an example update sequence for state and parameter estimations.

FIG. 4 is a flow chart that shows an example update process 400 for state and parameter estimations. In some implementations, the process 400 can be used by the example systems 100 or 200 of FIGS. 1 and 2, and/or by the example estimator 300 of FIG. 3. In the illustrated example, an actuator control system 401 operates substantially in parallel with a health monitoring system 402. In some implementations, the actuator control system 401 can be part of the example motor current control module 130 of FIG. 1, the example motor current control modules 230 of FIG. 2, or the example estimator 300 of FIG. 3. In some implementations, the health monitoring system 402 can be part of the example estimator module 110, the example estimator modules 210, or the example state estimator 310.

The example process 400 shows an example of a logical flow of calculations in the example actuator control system 401 and an example health monitoring system 402 for an example case where motor resistance and applied loads are monitored. They are both shown in FIG. 4 to indicate an example sequence of operations involving reading the sensors, processing the signals, and their usage by the health monitoring system 402.

The operations of the actuator control system 401 are performed on a predetermined interval. The operations generally include reading all the sensor inputs, then executing several nested control loops where each loop regulates a certain motor or actuator variable, and finally applying a voltage to the motor phases with the goal of regulating one or more actuator outputs. In some implementations, there could be variations in the structure of the feedback loops depending on the application. For example, the outermost loop could be an actuator position control loop followed by a motor speed loop and then a motor current loop. In some implementations, for actuator level health monitoring or other devices where the motor is a prime mover, the logical flow of the calculations and data exchanged between the actuator control and the health monitoring algorithm could be different.

The logic flow in the process 400 includes estimating actuator states and parameters, and checking the estimated parameters for faults. The state estimator includes two parts: a measurement update 404, and a time update 405. In general, the measurement update 404 corrects the estimate of the state and parameters based on the latest sensor measurements using a model of the way the sensor measures the quantities. This model can be referred to as a measurement model. It calculates the error between the estimated states and the measurements and uses a feedback loop and a dynamically calculated gain to minimize this error. The gain is calculated based on the covariance of the estimated states, and the known covariance of the model uncertainties and measurement noise.

The time update 405 uses a model of motor dynamics including the effect of model parameter uncertainties (e.g., a process model). The states and parameters of the model are obtained by numerically integrating a set of differential equations described in the process model from the beginning to the end of the current major time step. As a way to improve accuracy, the integration is updated at a smaller time step called the minor time step. The time update 405 essentially extrapolates the states and the parameters based on the process model.

The time update 405 and measurement update 404 are executed in a loop repeatedly. When each new measurement of the states is available, the extrapolated values of the states obtained from the time update 405 are corrected by the measurement update 404. The time update 405 then takes the corrected values of the states and extrapolates it to when the next measurement is made available.

In the following examples, a permanent magnet synchronous motor (PMSM) model is described in D-Q coordinates for the process model. The states $I_q$, $I_d$, (e.g., currents of the motor in DQ coordinates that can be related to phase currents by a coordinate transformation such as Clarke-Park transformations) and motor speed are natural states of the motor. The phase resistance R and the external load on the motor $T_d$ are parameters and were treated as auxiliary state variables. We appended the differential equations corresponding to parameters R and $T_d$ to be estimated. This makes it a 5-state state space model.

In the following examples, to reduce the number of parameters to be estimated, J (e.g., inertia of the motor or actuator), $W_b$ (e.g., peak flux linkage of the motor rotor permanent magnet), B (e.g., viscous damping rate acting on the motor), $L_d$ (e.g., D-axis synchronous inductance), and $L_q$ (e.g., Q-axis synchronous inductance) are assumed to be constant and known. This results in a 5-state nonlinear PMSM model in D-Q coordinates and forms the basis of the Extended Kalman filter (EKF).

$$L_q \frac{dI_q}{dt} = -RI_q - P\omega L_d I_d - PW_b \omega + V_q$$

$$L_d \frac{dI_d}{dt} = -RI_d + P\omega L_q I_q + V_d$$

$$T_e = 1.5P[W_b I_q + (L_d - L_q)I_d I_q]$$

$$\frac{d\omega}{dt} = -B\omega + T_e/J - T_L/J$$

$$\frac{dR}{dt} = 0$$

$$\frac{dT_d}{dt} = 0$$

To detect other motor failures, such as bearing friction and/or rotor magnet flux loss, the parameters B and $W_b$ can also be treated as unknown. These would be estimated by adding two more auxiliary state equations as follows:

$$L_q \frac{dI_q}{dt} = -RI_q - P\omega L_d I_d - PW_b \omega + V_q$$

$$L_d \frac{dI_d}{dt} = -RI_d + P\omega L_q I_q + V_d$$

$$T_e = 1.5P[W_b I_q + (L_d - L_q)I_d I_q]$$

$$\frac{d\omega}{dt} = -B\omega + T_e/J - T_L/J$$

$$\frac{dR}{dt} = 0$$

$$\frac{dT_d}{dt} = 0$$

$$\frac{dB}{dt} = 0$$

$$\frac{dW_b}{dt} = 0$$

In some implementations, failures in other types of motors could also be addressed by using equations that describe the dynamics of those types of motors. For example, an AC induction motor would not have rotor magnets but would have windings on the rotor as well. The equations that relate the current and speed to applied voltages would be different than the equations above, but would follow the same principle of assigning appropriate parameters to the corresponding physical failure.

The equations above can be rewritten more compactly as:

$$\frac{dx}{dt} = f(x(t)) + g(x(t))u(t)$$

With:

$$f(x) = \big(-x_4 x_1/L_q - Px_3 L_d x_2/L_q - PW_b x_3/L_q - x_4 x_2/L_d +$$
$$Px_3 L_q x_1/L_d - Bx_3/J + 1.5P[W_b x_1 + (L_d - L_q)x_2 x_1]/J - x_5/J00\big)$$

$$g(x) = \begin{pmatrix} 1/L_q & 0 \\ 0 & 1/L_d \\ 0 & 0 \\ 0 & 0 \\ 0 & 0 \end{pmatrix}$$

And where:

$$x = (I_q, I_d, W, R, T_d)$$

$$u = (V_q, V_d)$$

In addition, there is some uncertainty in the model parameters, which is modeled as an external disturbance w(t), which is a 5×1 vector corresponding to the number of state variables. Also, it is assumed that w(t) is a zero mean random variable that has a Gaussian probability distribution with covariance given by the diagonal matrix Q. Hence the complete process model looks like:

$$\frac{dx}{dt} = f(x) + g(x)u(t) + w(t)$$

To extrapolate the process states from time t=kT to t=(k+1)T, the above differential equations are integrated during the time period T. To extrapolate the error covariance matrix P(t) to the next sample time we use the linear model representation of 3) obtained by taking the linear approximation of f(x) and g(x) around the current state $x_k$.

$$F = \frac{\partial f}{\partial x} = \begin{pmatrix} -\frac{x_4}{L_q} & -\frac{L_d P x_3}{L_q} & -\frac{(PW_b + PL_d x_2)}{L_q} & -\frac{x_1}{L_q} & 0 \\ -\frac{L_q P x_3}{L_d} & -\frac{x_4}{L_d} & \frac{L_q P x_1}{L_d} & -\frac{x_2}{L_d} & 0 \\ \frac{1.5P[W_b x_1 + (L_d - L_q)x_2 x_1]}{J} & \frac{1.5P[W_b x_1 + (L_d - L_q)x_2 x_1]}{J} & -\frac{B}{J} & 0 & \frac{1}{J} \\ 0 & 0 & 0 & 0 & 0 \\ 0 & 0 & 0 & 0 & 0 \end{pmatrix}$$

-continued $$G = \partial g/\partial x = \begin{pmatrix} 0 & 0 \\ 0 & 0 \\ 0 & 0 \\ 0 & 0 \\ 0 & 0 \end{pmatrix}$$

The measured state variables are:

$$y_1 = I_q = x_1; y_2 = I_d = x_2; y_3 = \omega = x_3$$

Where $I_q$ is the q-axis current, $I_d$ is the d-axis current, and $\omega$ is the motor speed. Including the effect of measurement noise from the sensors, this can be written compactly as:

$$y_k = Hx_k + v_k$$

Where:

$$H = \begin{pmatrix} 1 & 0 & 0 & 0 & 0 \\ 0 & 1 & 0 & 0 & 0 \\ 0 & 0 & 1 & 0 & 0 \end{pmatrix}$$

And $y_k$ is a 3×1 vector corresponding to the number of measured state variables. Also, it assumed that $v_k$ is a zero mean random variable that has a Gaussian probability distribution with covariance defined by the matrix R.

At 410, the actuator control system 401 initializes an electronic controller unit. For example, the example electronic control unit 101 of FIG. 1 can perform startup tasks at power up or after a reboot, such as initializing processors, memory, running built-in diagnostics, initializing software variables, and any other appropriate task that an electronic system may perform during startup.

At 412, estimator states and covariance matrices are initialized. At an initial state:

$$x_0 = 0$$

The error covariance matrix ($P_0$) is set to:

$$P_0 = \mathrm{diag}(p_{11}, p_{22}, p_{33}, p_{44}, p_{55})$$

The process noise covariance matrix (Q) is set to:

$$Q = \mathrm{diag}(q_{11}, q_{22}, q_{33}, q_{44}, q_{55})$$

The measurement noise covariance matrix (R) is set to:

$$R = \mathrm{diag}(r_{11}, r_{22}, r_{33})$$

Where "diag" defines a diagonal matrix with the elements within the parenthesis appearing on the main diagonal, and the values $p_{ii}$, $q_{ii}$, $r_{ii}$ are selected based on the uncertainty in the model parameters and sensor noise levels. In some implementations, the higher the noise or the uncertainty, the higher these values are. In some implementations, a good starting value for these parameters can be the covariance of the corresponding state variable or model parameter.

After initialization, the actuator control system 401 performs an actuator control loop 403. At 414, an actuator position command ($\theta^*_a$) is received (e.g., from a flight computer). At 416, sensors (e.g., current, voltage, position, speed) are read (e.g., $I_a$, $I_b$, $I_c$). $I_a$, $I_b$ and $I_c$ represent the phase currents (e.g., the current passing through phase A, phase B, and phase C windings) of the motor. In some embodiments, these phase currents can be measured by current sensors that are installed on the motor driver board in series with the respective windings. In some implementations, the example collection of feedback signals 342 can be read at 416.

At 418, position control laws are computed. At 420, motor current control laws are computed.

At 422, estimator input data is determined (e.g., $I_q$, $I_d$, $\omega$, $V_q$, $V_d$). In some implementations, the input data can be the example collection of motor control parameters 350.

At 424, PWM duty ratios are output to drive a motor drive inverter. For example, the example PWM signal generator 132 can be controlled to provide the example PWM signals 148 to the inverter module 150.

If at 426, no critical faults are detected, then the control loop 403 continues at 414. If a critical fault is detected, then the control loop 403 is stopped. In some implementations, non-critical faults (e.g., sensed early stages of wear or deterioration) may be addressed by being reported to a higher-level system (e.g., to schedule future service) while the actuator system is otherwise permitted to continue operating.

At 450, the health monitoring system 402 receives the estimator input data that was determined at 422.

$$y_1 = I_q = x_1; y_2 = I_d = x_2; y_3 = \omega = x_3$$

$$u = V_q, V_d$$

A measurement update 404 is performed, in which an error covariance matrix $P_k$ is determined at 452. If this is the first measurement update, the process uses initial condition values from 410. If not, then the process uses state $x_k(-)$ and covariance matrix $P_k(-)$ from a previous time update, described below, from the end of the last major time step. The error covariance is corrected using the latest measurement as:

$$P_k(+) = P_k(-) - P_k(-)H_k^T(H_kP_k(-)H_k^T + R)^{-1}H_kP_k(-)$$

An estimator gain matrix $K_k$ is determined at 454. The estimator gain matrix is given as:

$$K_k = P_k(+)H_k^T R^{-1}$$

A collection of estimated states $x_k$ is determined at 456. The extrapolated states in time update equations is corrected using the latest measurements as:

$$x_k(+) = x_k(-) + K_k(y_k - Hx_k(-))$$

A time update 405 is performed, in which error covariance matrix $P_k$ is updated at 460, and the collection of estimated states $x_k$ is updated at 462. In general, the measurement update 404 is performed on a first interval, and the time update 405 is performed on a relatively shorter and more frequent interval.

If this is the start of a major time step (k has increased) then the state $x(+)$ and covariance matrix $P_k(+)$ from the measurement update 404 from the previous major time step is used. Input voltage values that are available every major time step are used, or values of $x_k+1(-)$ and $P_k+1(-)$ from the previous minor time update 405 are used and the input voltage values read at the start of the major time step continue to be used.

The state $x_k+1$ and error covariance matrix $P_k+1$ are computed using the process model by numerically integrating a set of differential equations:

$$x_{k+1}(-)=x_k(+)+\int_{kT}^{(k+1)T}[f(x(t))+g(x(t)u(t)]dt$$

$$P_{k+1}(-)=P_k(+)+\int_{kT}^{(k+1)T}[F(x(t))P_k+F^T(x(t))P_k(+)+Q]dt$$

At 470, the duration of the time update 405 is determined. If the time update 405 has not been performed more than a predetermined number of times (e.g., N), then at 471 a count of time updates (e.g., J) is incremented and the time update 405 continues at 460. If the time update 405 has been performed more than a predetermined number of times (e.g., N), then a collection of estimated (e.g., simulated) motor parameters is output at 472.

In some real-time or quasi-real-time applications, the estimator can be run at a fixed update period. In some examples of motor current control loops, this can be set to a value in the range of about 50 microseconds to about 100 microseconds, but the estimator can be run slower if the estimates are not required for control action. The time update part of the estimator involves numerically integrating the state equations, so a smaller update period can be used. In some examples, the smaller time period can be referred to as a minor time step, and the larger time period as a major time step.

As an example, the minor time step would be 10 microseconds and the major time step would be 100 microseconds. Inputs to the estimator in the form of sensor measurements and voltage commands are read at every major time step, that is 100 microseconds. The time update 405 would run every 10 microseconds and the measurement update 404 would run every 100 microseconds.

A fault detector module 406 receives the estimated motor parameters. At 480, the estimated motor parameters are compared against one or more predetermined fault threshold values (e.g., maximum currents, maximum voltages). At 482, if no fault is determined (e.g., based on the comparison at 480), then at 490 a count of measurement updates (e.g., k) is incremented and the count of time updates (e.g., j) is reset to 1 before the health monitoring system 402 continues at 450. At 482, if a critical fault is determined, then a remedial action can be taken. In the illustrated example, the health monitoring system 402 stops. In some implementations, the health monitoring system 402 can provide a fault signal based on the modeled one or more estimated motor values of the motor and a predetermined parameter threshold value, and/or can modify a non-transitory computer readable medium based on the fault signal. For example, a fault can be communicated to human operators (e.g., flight crews, maintenance personnel) and/or to other systems (e.g., a flight computer, recorded in an electronic fault log). In some implementations, non-critical faults (e.g., sensed early stages of wear or deterioration) may be addressed by being reported to a higher-level system (e.g., to schedule future service) while the actuator system is otherwise permitted to continue operating.

In various implementations, various methods can be used to detect a fault using the estimates of the states and parameters, and any of them can be used with the estimator. For example, the estimated motor parameters can be compared against predetermined fault thresholds. The threshold values can be calculated from the nominal values by correcting them for manufacturing tolerances and temperature variations. For example, to calculate the fault threshold for motor winding resistance, a tolerance can be added to the nominal value of the winding resistance, and can be extrapolated to the limits of the operating temperature. After adding a small margin to the nominal value, a fault threshold can be determined. In another example, a running average and standard deviation of the motor parameters can be determined during operation. In examples such as this, if the average value of the estimated motor phase resistance for example exceeds the nominal value, including tolerances, by more than two or three standard deviations, then a fault can be said to have occurred.

In another example, the entire error vector calculated as the difference between the estimated and the measured values of the states can be examined, and the variance of the error can be determined. The variance can be compared against predetermined threshold values for the error variance under no-fault conditions, which can be obtained by simulations of the motor model.

Figure 5:
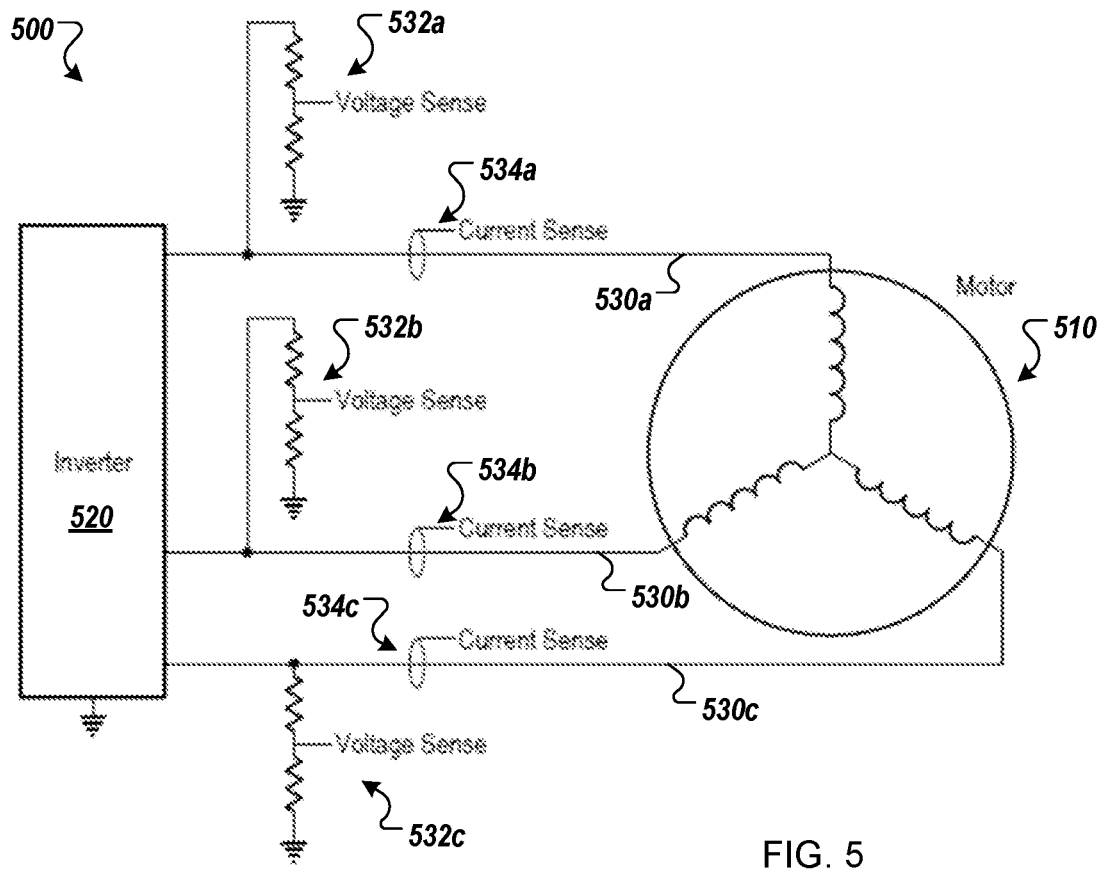
FIG. 5 is a schematic diagram of an example configuration for sensing voltage and current sensing of a multiple-phase motor actuator.

FIG. 5 is a schematic diagram of an example configuration 500 for sensing voltage and current sensing of a multiple-phase motor actuator 510, such as the example motor actuator 120 of FIG. 1, the example motor actuators 220a and/or 220b of FIG. 2, and the example motor actuator 320 of FIG. 3.

In the configuration 500, an inverter 520 is configured to provide multiphase power to the motor actuator 510 through a phase circuit 530a, a phase circuit 530b, and a phase circuit 530c. A voltage sense circuit 532a and a current sense circuit 534a are configured to measure voltage to circuit return and current, respectively, of the phase circuit 530a. A voltage sense circuit 532b and a current sense circuit 534b are configured to measure voltage to circuit return and current, respectively, of the phase circuit 530b. A voltage sense circuit 532c and a current sense circuit 534c are configured to measure voltage to circuit return and current, respectively, of the phase circuit 530c. In some embodiments, the voltage sense circuits 532a-532c and/or the current sense circuits 534a-534c can output measurement signals that can be received by an estimator module (e.g., the estimator module 110, the estimator modules 210, the state estimator 310, the health monitoring system 402).

Figure 6:
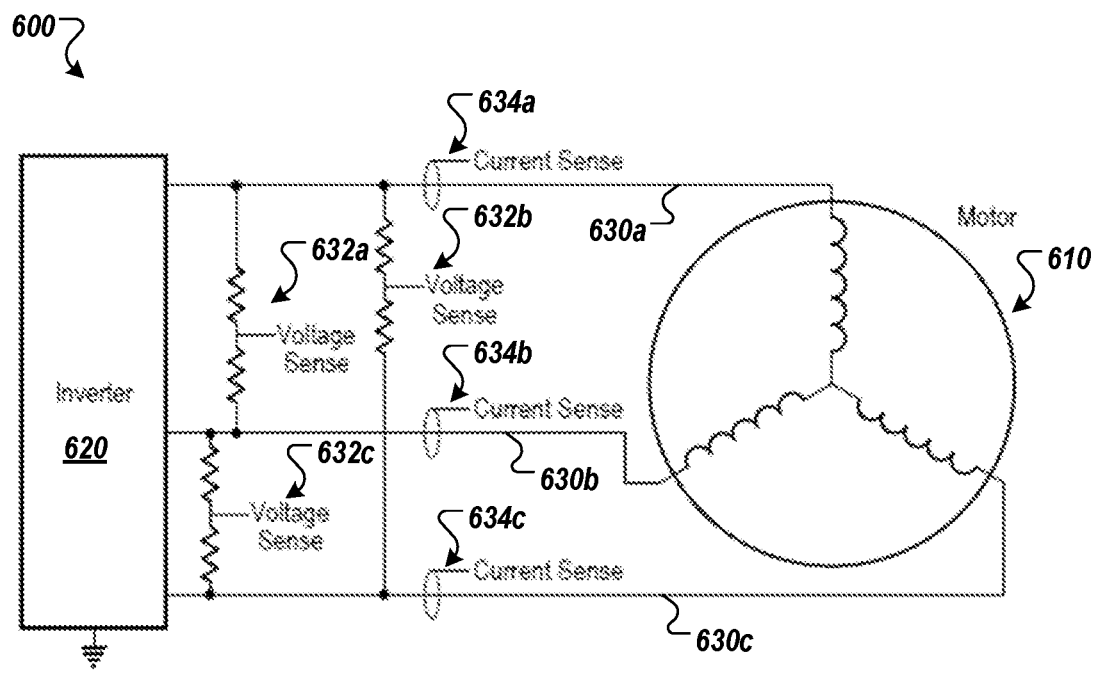
FIG. 6 is a schematic diagram of another example configuration for sensing voltage and current sensing of a multiple-phase motor actuator.

FIG. 6 is a schematic diagram of another example configuration 600 for sensing voltage and current sensing of a multiple-phase motor actuator 610, such as the example motor actuator 120 of FIG. 1, the example motor actuators 220a and/or 220b of FIG. 2, and the example motor actuator 320 of FIG. 3.

In the configuration 600, an inverter 620 is configured to provide multiphase power to the motor actuator 610 through a phase circuit 630a, a phase circuit 630b, and a phase circuit 630c. A voltage sense circuit 632a and a current sense circuit 634a are configured to measure voltage across the phase circuits 630a and 630b and current, respectively, of the phase circuit 630a. A voltage sense circuit 632b and a current sense circuit 634b are configured to measure voltage across the phase circuits 630a and 630c and current, respectively, of the phase circuit 630b. A voltage sense circuit 632c and a current sense circuit 634c are configured to measure voltage across the phase circuits 630b and 630c and current, respectively, of the phase circuit 630c. In some embodiments, the voltage sense circuits 632a-632c and/or the current sense circuits 634a-634c can output measurement signals that can be received by an estimator module (e.g., the estimator module 110, the estimator modules 210, the state estimator 310, the health monitoring system 402).

Figure 7:
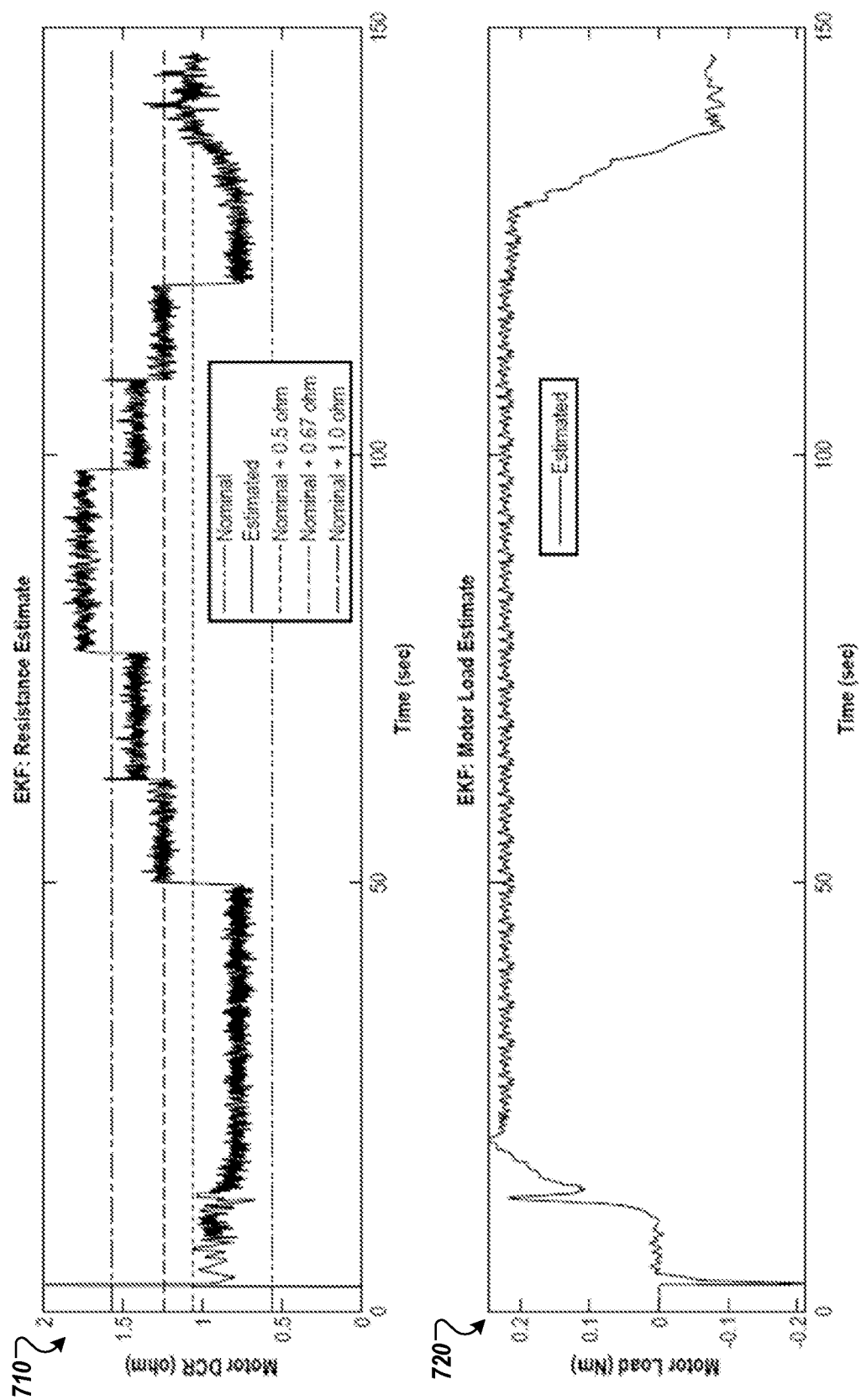
FIG. 7 is a graph of an example comparison of motor actuator resistance and load.
Figure 8:
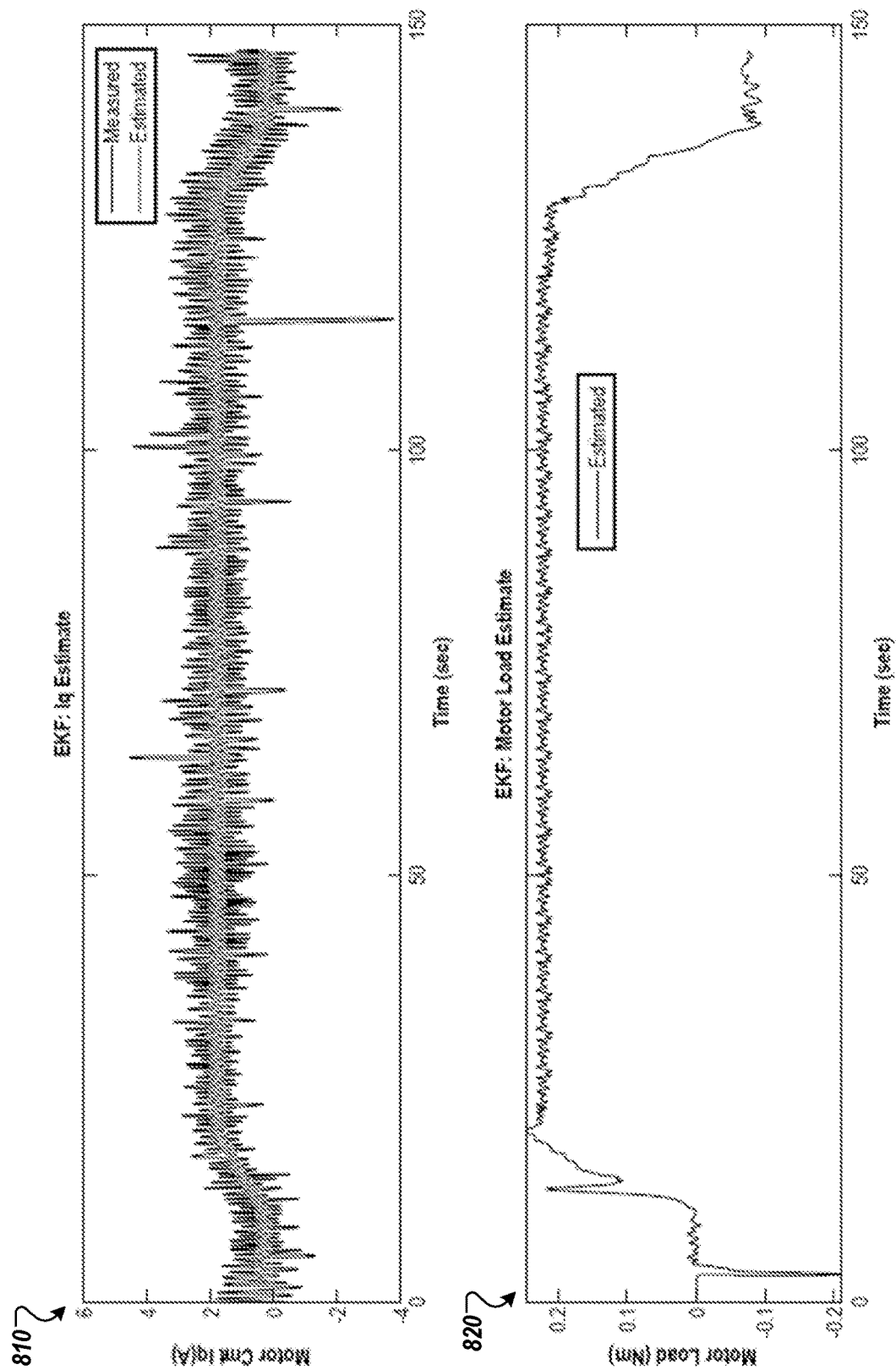
FIG. 8 is a graph of an example comparison of motor actuator current and load.

An example of the results are summarized in test data shown in FIGS. 7 and 8. In this example experiment, a motor was run at constant speed, and the load was increased from zero to 0.2 Nm (e.g., about 28 in-ozf). Then, additional series resistances were added in three steps to the motor phases, using a load box as indicated by the dashed straight lines. The experiment was configured to perform increments of 0.17 ohm and 0.33 ohm or decrements of 0.5 ohm, to be analogous to changes in motor phase resistance due to temperature. For example, if the ambient temperature changes from −55° C. to +85° C., then the motor resistance can change by approximately +/−30% from nominal at room temperature. The choice of series resistances can change the resistance from about −54% to +46% of the nominal value at room temperature, which can be used to simulate changes of motor resistance beyond the changes due to temperature variation.

In the top half of FIG. 7 (710), it can be seen that the estimator can track the changes in resistance with a small error. In the bottom half of FIG. 7 (720), it can be seen that the applied load was correctly estimated, even though no physical torque sensor was used to measure it.

The top half of FIG. 8 (810) shows that the estimator correctly estimated the motor current as the load was ramped up. The bottom half of FIG. 8 (820) shows the estimated load, same as in FIG. 7. The offset in the estimate of the resistance is due to errors in the motor parameters assumed to be known, such as the back-EMF constant, the cogging torque in the motor, and/or friction in the test stand. Note however that the change in the estimated resistance is approximately equal to the change in series resistance that was added to the motor. Also note that the detection and annunciation of a fault is not illustrated in the figures.

Figure 9:
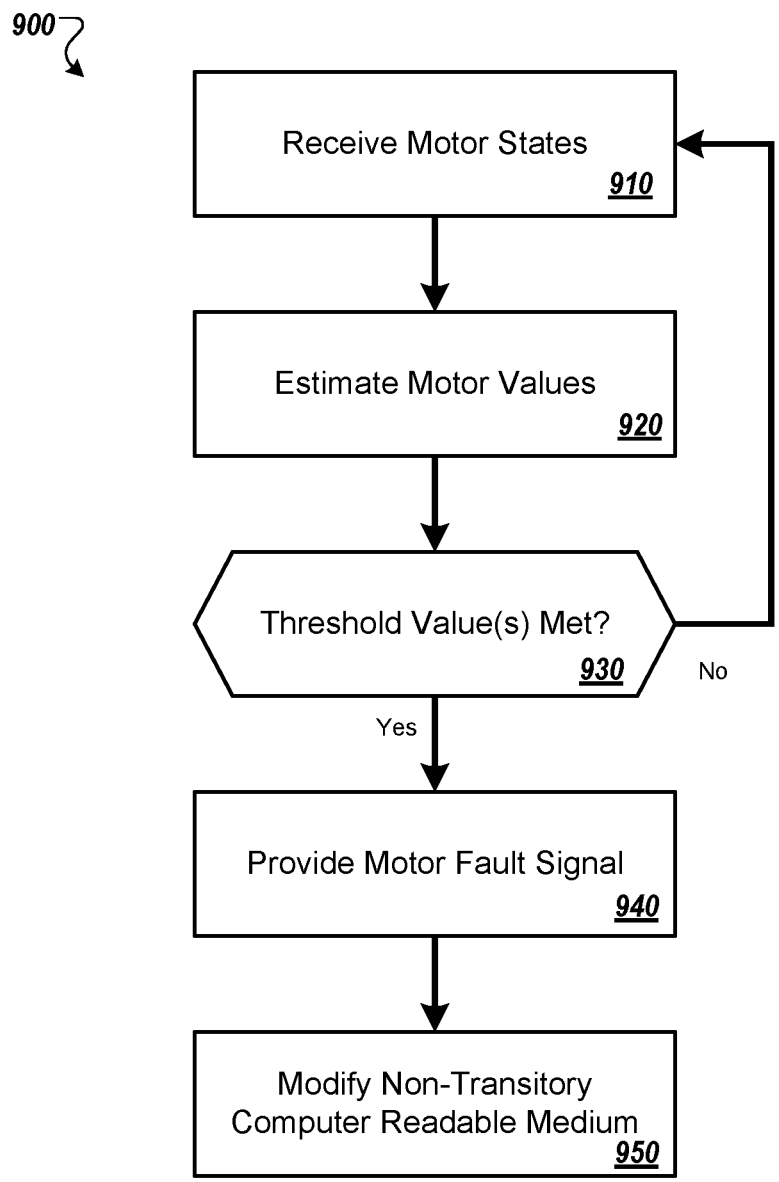
FIG. 9 is a flow chart of an example process for monitoring health of a motor actuator.

FIG. 9 is a flow chart of an example process 900 for monitoring health of a motor actuator, such as the example motor actuator 120 of FIG. 1, the example motor actuators 220a and/or 220b of FIG. 2, the example motor actuator 320 of FIG. 3, the example motor actuator 510 of FIG. 5, and the example motor actuator 610 of FIG. 6.

At 910 one or more motor control states of an electric motor are received. For example, a collection of motor states (e.g., the example collection of motor control parameters 350, the output of 422 of the example health monitoring system 402) can be received from an estimator module (e.g., the example estimator module 110, the example estimator modules 210, the example state estimator 310, the example health monitoring system 402). In some implementations, the motor actuator can be an electric motor that is one of a brushless direct-current (DC) motor or a permanent magnet synchronous motor (PMSM).

In some implementations, the process 900 can include determining the one or more motor control states of the electric motor. For example, the one or more motor control states of an electric motor can be received by the state estimator 310 from the motor controller 330.

In some implementations, the process 900 can include providing, to the electric motor, one or more motor control signals based on the determined one or more motor control states. For example, the motor controller 330 can provide the collection of motor phase voltages 332 to the motor actuator 320.

At 920, one or more estimated motor values of the electric motor are estimated based on one or more of the received motor control states and one or more motor control parameters. For example, the state estimator 310 can model the behavior of the motor actuator 320 based on the motor control parameters 350 and can provide a collection of estimated outputs 360. The collection of estimated outputs 360 can include information that is descriptive of one or more of estimated Q axis current(s), estimated D axis current(s), estimated rotor speed, estimated phase resistance(s), estimated flux(es), estimated flux constant(s), estimated disturbance load(s), and estimated friction coefficient(s).

In some implementations, estimating one or more estimated motor values of the electric motor based on one or more of the received motor control states can include receiving one or more feedback signals based on one or more measured states of the electric motor, determining a state value representative of a state of the electric motor based on the received one or more feedback signals, determining one or more parameter values of the electric motor based on the received one or more feedback signals, determining an error value based on the received one or more feedback signals and on one or more of the determined state values and the determined one or more parameter values, determining a gain value based on a covariance of the determined state value and a predetermined covariance of model uncertainties and a predetermined covariance of measurement noise, and reducing the error value based on a control loop based on the determined gain value. For example, the example collection of motor control parameters 350 can include the feedback signals 342, and the state estimator 310 can perform the algorithms of the example process 400.

In some implementations, estimating one or more estimated motor values of the electric motor based on one or more of the received motor control states can include performing a first collection of update operations at a first frequency, the first collection of update operations including determining an error covariance value based on one or more of the received motor control states, determining an estimator gain matrix based on the determined error covariance, extrapolating a state value based on the estimated gain matrix and one or more of the received motor control states, and providing at least one of the extrapolated state value and the determined error covariance value as the one or more estimated motor values. For example, the example measurement update 404 can be performed as discussed in the description of the example process 400.

In some implementations, the extrapolated state value can be based on the equation: $x_k(+) = x_k(-) + K_k(y_k - Hx_k(-))$, as discussed in the description of the example process 400. For example, the extrapolated state value can be determined and then adjusted, refined, and/or corrected by use of the preceding equation.

In some implementations, estimating one or more estimated motor values of the electric motor based on one or more of the received motor control states can include performing a second collection of update operations at a second frequency, the second collection of update operations including determining an updated state value based on the extrapolated state value and a time value based on the second frequency, and determining an updated error covariance value based on the determined error covariance value and a time value based on the second frequency, and providing at least one of the updated state value and the updated error covariance value as the one or more estimated motor values. In some implementations, the second frequency can be more frequent than the first frequency. For example, the example the time update 405 can be performed more frequently than the example measurement update 404, as discussed in the description of the example process 400. In some implementations, updated state value can be based on the equation: $x_{k+1} = x_k(+) + \int_{kT}^{(k+1)T}[f(x(t)) + g(x(t)u(t)]dt$.

At 930, one or more of the estimated motor values is compared to a predetermined parameter threshold value. For example, the fault detector module 406 can be configured (e.g., preprogrammed, calibrated) with threshold values (e.g., limits) for some, any, or all of the motor parameters is output at 472 (e.g., the collection of estimated outputs 360). The fault detector module 406 can compare the estimated motor values to the threshold values in order to determine if any of the thresholds have been crossed, which can be indicative of a fault. In some implementations, a short or open at the motor terminals can cause a step change in the winding impedance that can also useful to monitor.

At 940, a motor fault signal is provided based on the comparing. For example, the example estimator module 110 can perform the comparing, and provide a fault signal to the example flight computer 102. In another example, the flight computer 102 can perform the comparing, and provide a fault signal to human operators and/or to other automated systems.

In some implementations, the process 900 can include one or more of (1) providing the fault signal as an indicator representative of a presence of a fault of the electric motor, and (2) switching control of an actuatable mechanical load from the electric motor to a redundant electric motor based on the provided fault signal. For example, the example flight computer 102 can illuminate a warning light, sound an audible alarm, provide a textual or graphical display on a user interface, trigger a haptic feedback device, or provide any other appropriate form of output that can be perceived by an operator as an indication of an actuator fault. In another example, the example flight computer 202 can respond to a determination of a fault in one of the motor actuators (e.g., the motor actuator 220b) and respond by controlling another motor actuator (e.g., the motor actuator 220a) to control operation of the drivetrain 221 and the flight control surface 222.

At 950, a non-transitory computer readable medium is modified based on the provided motor fault signal. For example, the example estimator module 110 and/or the example flight computer 102 can receive a motor fault signal and respond by altering a software variable in RAM or static memory, or by logging an entry in an electronic log or database that is stored on a hard disk, a FLASH memory, a flight recorder tape, or any appropriate non-transitory recording medium.

In some implementations, an output to the flight computer could be a fault message, or a message indicating maintenance is needed soon. This could be a result of a continuous built-in test. This output could be communicated by a discrete signal or over a communication bus to the flight computer 102 or 202.

In some implementations, the health monitoring processes could be part of a start-up built in test routine. For example, a go/no-go indication can be sent to flight computer 102 or 202 by a discrete signal (e.g., fault/no fault) and/or message on a communication bus.

In some implementations, metrics that are descriptive of motor and/or actuator wear can be logged during flight. Later, in maintenance mode, a maintenance computer (e.g., PC or laptop) can be connected to the electronic control unit to view, download and analyze the data. Post-processing of the logged data can be done using a software application running on the maintenance computer.

Figure 10:
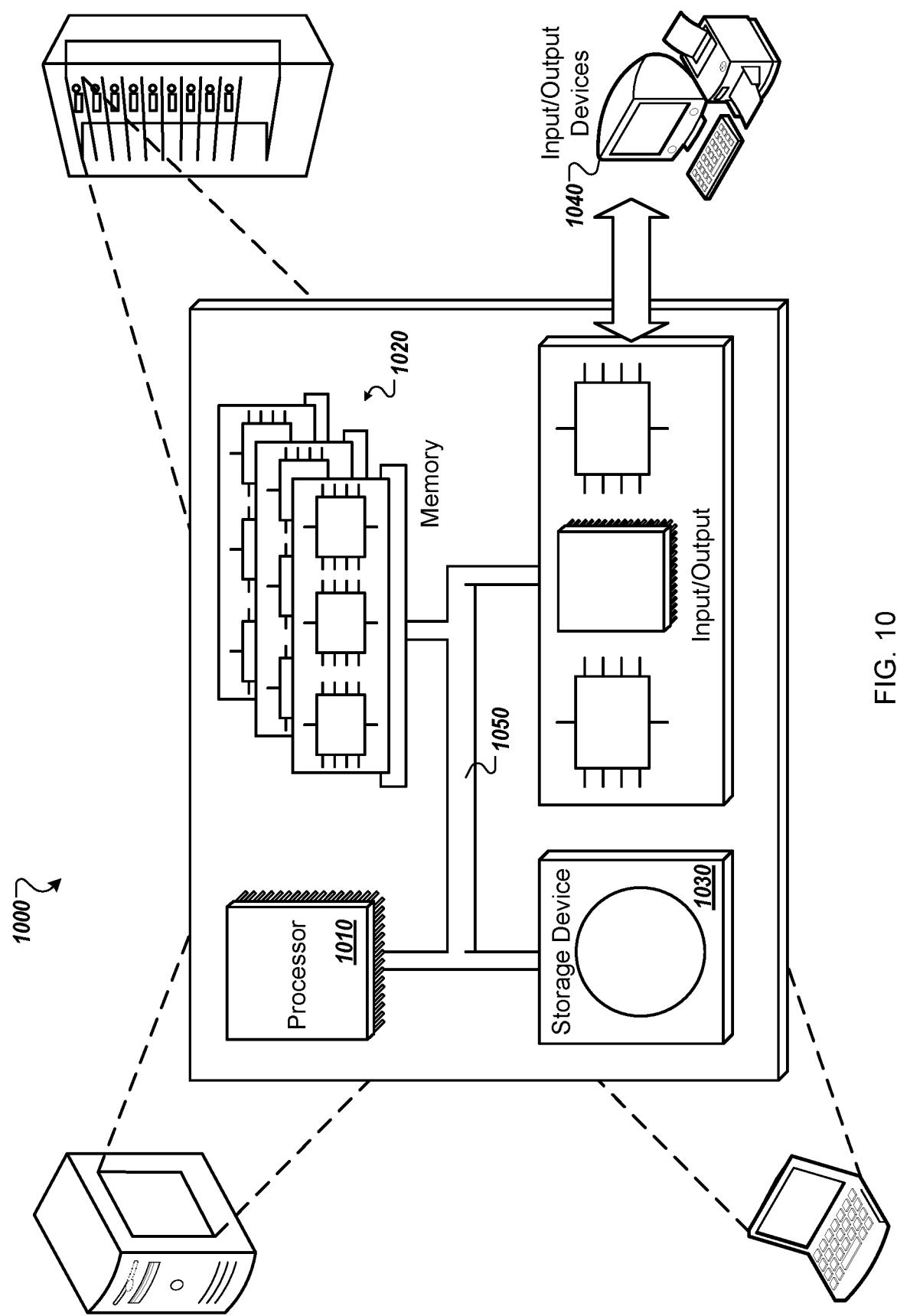
FIG. 10 is a schematic diagram of an example of a generic computer system.

FIG. 10 is a schematic diagram of an example of a generic computer system 1000. The system 1000 can be used for the operations described in association with the example process 400 and/or 900 according to one implementation. For example, the system 1000 may be included in either or all of the example electronic control unit 101, the example flight computer 102, the example electronic control unit 201a, the example electronic control unit 201b, the example flight computer 202, the example motor controller 330, the example state estimator 310, the example actuator control system 401, and the example health monitoring system 402.

The system 1000 includes a processor 1010, a memory 1020, a storage device 1030, and an input/output device 1040. In some embodiments, the processor 1010 can be a field-programmable gate array (FPGA). Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, a FLASH memory device, an EEPROM device, an MRAM device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor or FPGA coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. An electric motor health monitoring system comprising:
   an estimator module configured to model one or more estimated motor values of an electric motor based on one or more motor control parameters and one or more motor control states;
   a non-transitory computer readable medium; and
   a fault detector module configured to (1) provide a motor fault signal representative of a presence of a fault of the electric motor and based on the modeled one or more estimated motor values of the motor and a predetermined parameter threshold value, and (2) modify the non-transitory computer readable medium based on the motor fault signal.

2. The electric motor health monitoring system of claim 1, wherein the electric motor is one of a brushless direct-current (DC) motor or a permanent magnet synchronous motor (PMSM).

3. The electric motor health monitoring system of claim 1, wherein the one or more motor control parameters and the one or more motor control states are received from an electric motor controller configured to determine the one or more motor control parameters and the one or more motor control states and provide one or more motor control outputs to the electric motor based on the one or more determined motor control parameters and the one or more determined motor control states.

4. The electric motor health monitoring system of claim 1, wherein the estimator module is configured to:
   receive one or more feedback signals based on one or more measured motor states;
   determine a state value representative of a state of the motor based on the received one or more feedback signals, the motor control parameters, and the one or more motor control states;
   determine one or more of the estimated motor values of the motor based on the received one or more feedback signals;
   determine an error value based on the received one or more feedback signals and on one or more of the determined one or more estimated motor values;
   determine a gain value based on a covariance of the one or more estimated motor values and a predetermined covariance of model uncertainties and a predetermined covariance of measurement noise; and
   reduce the error value based on a control loop based on the determined gain value.

5. The electric motor health monitoring system of claim 1, wherein the estimator module is configured to perform a first collection of update operations at a first frequency, the first collection of update operations comprising:
   determining an error covariance value based on the one or more motor control parameters;
   determining an estimator gain matrix based on the determined error covariance;
   extrapolating a state value based on the estimated gain matrix and the one or more motor control parameters; and
   providing at least one of the extrapolated state value and the determined error covariance value as the one or more estimated motor values.

6. The electric motor health monitoring system of claim 5, wherein the extrapolated state value is based on an equation:

$$x_k(+) = x_k(-) + K_k(y_k - Hx_k(-)).$$

7. The electric motor health monitoring system of claim 5, wherein the estimator module is further configured to perform a second collection of update operations at a second frequency, the second collection of update operations comprising:
   determining an updated state value based on the extrapolated state value and a time value based on the second frequency; and
   determining an updated error covariance value based on the determined error covariance value and a time value based on the second frequency; and providing at least one of the updated state value and the updated error covariance value as the one or more estimated motor values.

8. The electric motor health monitoring system of claim 7, wherein the updated state value is based on the equation:

$$x_{k+1}=x_k(+)+\int_{kT}^{(k+1)T}[f(x(t))+g(x(t)u(t)]dt.$$

9. The electric motor health monitoring system of claim 7, wherein the second frequency is more frequent than the first frequency.

10. The electric motor health monitoring system of claim 1, wherein the fault detector module is configured to perform one or more of:
   (1) providing the motor fault signal as an indicator representative of a presence of the fault of the electric motor; and
   (2) switching control of an actuatable mechanical load from the electric motor to a redundant electric motor based on the provided motor fault signal.

11. The electric motor health monitoring system of claim 1, wherein the fault detector module is configured to:
   compare one or more of the estimated motor values to a predetermined motor value threshold value; and
   provide the motor fault signal based on the comparing.

12. A method of monitoring electric motor health, comprising:
   receiving one or more motor control states of an electric motor;
   estimating one or more estimated motor values of the electric motor based on one or more of the received motor control states and one or more motor control parameters;
   comparing one or more of the estimated motor values to a predetermined parameter threshold value;
   providing a motor fault signal representative of a presence of a fault of the electric motor based on the comparing; and
   modifying a non-transitory computer readable medium based on the provided motor fault signal.

13. The method of claim 12, wherein the electric motor is one of a brushless direct-current (DC) motor or a permanent magnet synchronous motor (PMSM).

14. The method of claim 12, further comprising determining the one or more motor control states of the electric motor.

15. The method of claim 14, further comprising providing, to the electric motor, one or more motor control signals based on the determined one or more motor control states.

16. The method of claim 12, wherein estimating one or more estimated motor values of the electric motor based on one or more of the received motor control states comprises:
   receiving one or more feedback signals based on one or more measured states of the electric motor;
   determining a state value representative of a state of the electric motor based on the received one or more feedback signals;
   determining one or more parameter values of the electric motor based on the received one or more feedback signals;
   determining an error value based on the received one or more feedback signals and on one or more of the determined state values and the determined one or more parameter values;
   determining a gain value based on a covariance of the determined state value and a predetermined covariance of model uncertainties and a predetermined covariance of measurement noise; and
   reducing the error value based on a control loop based on the determined gain value.

17. The method of claim 16, wherein estimating one or more estimated motor values of the electric motor based on one or more of the received motor control states comprises:
   performing a first collection of update operations at a first frequency, the first collection of update operations comprising:
      determining an error covariance value based on one or more of the received motor control states;
      determining an estimator gain matrix based on the determined error covariance;
      extrapolating a state value based on the estimated gain matrix and one or more of the received motor control states; and
      providing at least one of the extrapolated state value and the determined error covariance value as the one or more estimated motor values.

18. The method of claim 17, wherein the extrapolated state value is based on the equation: $x_x(+)=x_k(-)+K_k(y_k-Hx_k(-))$.

19. The method of claim 17, wherein estimating one or more estimated motor values of the electric motor based on one or more of the received motor control states comprises:
   performing a second collection of update operations at a second frequency, the second collection of update operations comprising:
      determining an updated state value based on the extrapolated state value and a time value based on the second frequency; and
      determining an updated error covariance value based on the determined error covariance value and a time value based on the second frequency; and
   providing at least one of the updated state value and the updated error covariance value as the one or more estimated motor values.

20. The method of claim 19, wherein the updated state value is based on the equation: $x_{x+1}=x_k(+)+\int_{kT}^{(k+1)T}[f(x(t))+g(x(t)u(t)]dt$.

21. The method of claim 19, wherein the second frequency is more frequent than the first frequency.

22. The method of claim 12, further comprising one or more of:
   (1) providing the motor fault signal as an indicator representative of the presence of the motor fault of the electric motor, and
   (2) switching control of an actuatable mechanical load from the electric motor to a redundant electric motor based on the provided motor fault signal.

23. An electric motor control system comprising:
   a motor controller configured to determine one or more motor control states and provide the one or more determined motor control states to an electric motor; and
   a motor health monitor comprising:
      an estimator module configured to model one or more estimated motor values of the electric motor based on one or more motor control parameters and the one or more motor control states; and
      a fault detector module configured to (1) provide a motor fault signal representative of a presence of a fault of the electric motor and based on the modeled one or more estimated motor values of the electric motor and a predetermined motor value threshold value, and (2) modify a non-transitory computer readable medium based on the provided motor fault signal.

24. The electric motor control system of claim 23, wherein the electric motor is one of a brushless direct-current (DC) motor or a permanent magnet synchronous motor (PMSM).

25. The electric motor control system of claim 23, wherein the estimator module is configured to:
  receive one or more feedback signals based on one or more measured states of the motor, determine an estimated state value representative of a state of the motor based on the received one or more feedback signals;
  determine one or more estimated parameter values of the motor based on the received one or more feedback signals;
  determine an error value based on the receiving one or more feedback signals and on one or more of the determined state value and the determined one or more estimated parameter values;
  determine a gain value based on a covariance of the determined state value and a predetermined covariance of model uncertainties and a predetermined covariance of measurement noise; and
  reduce the error value based on a control loop based on the determined gain value.

26. The electric motor control system of claim 23, wherein the estimator module is configured to perform a first collection of update operations at a first frequency, the first collection of update operations comprising:
  determining an error covariance value based on the one or more motor control parameters;
  determining an estimator gain matrix based on the determined error covariance;
  extrapolating a state value based on the estimated gain matrix and the one or more motor control parameters; and
  providing at least one of the extrapolated state value and the determined error covariance value as the one or more estimated motor values.

27. The electric motor control system of claim 26, wherein the extrapolated state value is based on the equation: $x_k(+)=x_k(-)+K_k(y_k+Hx_k(-))$.

28. The electric motor control system of claim 26, wherein the estimator module is further configured to perform a second collection of update operations at a second frequency, the second collection of update operations comprising:
  determining an updated state value based on the extrapolated state value and a time value based on the second frequency;
  determining an updated error covariance value based on the determined error covariance value and a time value based on the second frequency; and
  providing at least one of the updated state value and the updated error.

29. The electric motor control system of claim 23, wherein the fault detector module is configured to perform one or more of;
  (1) provide the motor fault signal as an indicator representative of the presence of the motor fault of the electric motor;
  (2) switch control of an actuatable mechanical load from the electric motor to a redundant electric motor based on the provided motor fault signal; and
  (3) modify contents of a non-transitory computer-readable medium based on the provided motor fault signal.

30. The electric motor control system of claim 23, wherein the fault detector module is configured to:
  compare one or more of the one or more estimated motor values to a predetermined motor value threshold value; and
  provide the motor fault signal based on the comparing.

* * * * *

UNITED STATES PATENT AND TRADEMARK OFFICE
CERTIFICATE OF CORRECTION

Page 1 of 1

PATENT NO. : 12,283,910 B2
APPLICATION NO. : 18/075165
DATED : April 22, 2025
INVENTOR(S) : Ganga P. Jayaraman and Steven Adams It is certified that error appears in the above-identified patent and that said Letters Patent is hereby corrected as shown below:

In the Claims

At Column 23, Line 7, at Claim 8, delete "$g(x(t)$" and insert -- $g(x(t))$ --.

At Column 24, Line 20, at Claim 18, delete "$x_x(+)$" and insert -- $x_k(+)$ --.

At Column 24, Line 38, at Claim 20, delete "$x_{x+1}$" and insert -- $x_{k+1}$ --.

At Column 24, Line 39, at Claim 20, delete "$g(x(t)$" and insert -- $g(x(t))$ --.

At Column 24, Line 43, at Claim 22, delete "of;" and insert -- of: --.

At Column 24, Line 46, at Claim 22, delete "motor," and insert -- motor; --.

At Column 25, Line 8, at Claim 25, delete "motor," and insert -- motor; --.

At Column 26, Line 20, at Claim 29, delete "of;" and insert -- of: --.

Signed and Sealed this
First Day of July, 2025

Coke Morgan Stewart
*Acting Director of the United States Patent and Trademark Office*